United States Patent
Kim et al.

(10) Patent No.: US 8,437,115 B2
(45) Date of Patent: May 7, 2013

(54) MULTILAYER CERAMIC ELECTRONIC COMPONENT

(75) Inventors: Sang Huk Kim, Gyunggi-do (KR); Jang Ho Lee, Gyunggi-do (KR); Ju Myung Suh, Gyunggi-do (KR); Sung Hyuk Choi, Gyunggi-do (KR); Jong Hoon Bae, Gyunggi-do (KR); Jun Hee Kim, Gyunggi-do (KR); Seon Ki Song, Gyunggi-do (KR)

(73) Assignee: Samsung Electro-Mechanics Co., Ltd., Suwon (KR)

( * ) Notice: Subject to any disclaimer, the term of this patent is extended or adjusted under 35 U.S.C. 154(b) by 0 days.

(21) Appl. No.: 13/478,900

(22) Filed: May 23, 2012

(65) Prior Publication Data

US 2013/0027842 A1    Jan. 31, 2013

(30) Foreign Application Priority Data

Jul. 28, 2011  (KR) .......................... 10-2011-0075084

(51) Int. Cl.
*H01G 4/06*    (2006.01)
*H01G 4/008*   (2006.01)

(52) U.S. Cl.
USPC ......................................... 361/311; 361/305

(58) Field of Classification Search .................. 361/311, 361/303, 305
See application file for complete search history.

(56) References Cited

U.S. PATENT DOCUMENTS

| | | | |
|---|---|---|---|
| 7,072,170 B2 * | 7/2006 | Miyauchi et al. | 361/321.2 |
| 2007/0025060 A1 * | 2/2007 | Kim et al. | 361/321.4 |
| 2009/0067117 A1 * | 3/2009 | Kasuya et al. | 361/321.2 |

FOREIGN PATENT DOCUMENTS

| | | | |
|---|---|---|---|
| JP | 2002057060 A | * | 2/2002 |
| KR | 10-2005-0052404 A | | 6/2005 |
| KR | 10-2005-0077769 A | | 8/2005 |

* cited by examiner

*Primary Examiner* — Eric Thomas
(74) *Attorney, Agent, or Firm* — McDermott Will & Emery LLP (57) ABSTRACT

There is provided a multilayer ceramic electronic component, including: a ceramic body including a dielectric layer having an average thickness of 0.6 μm or less; and first and second inner electrode layers within the ceramic body, disposed to face each other with the dielectric layer interposed therebetween, wherein the dielectric layer includes contact dielectric grains in contact with the first or second inner electrode layer and non-contact dielectric grains not in contact with the first or second inner electrode layer, and, when an average thickness of the dielectric layer is defined as td and an average diameter of the contact dielectric grains is defined as De, De/td≦0.35 is satisfied. The multilayer ceramic electronic component has improved continuity of the inner electrode layer, large capacitance, extended accelerated lifespan and excellent reliability.

14 Claims, 3 Drawing Sheets

MULTILAYER CERAMIC ELECTRONIC COMPONENT

CROSS-REFERENCE TO RELATED APPLICATIONS

This application claims the priority of Korean Patent Application No. 10-2011-0075084 filed on Jul. 28, 2011, in the Korean Intellectual Property Office, the disclosure of which is incorporated herein by reference.

BACKGROUND OF THE INVENTION

1. Field of the Invention

The present invention relates to a multilayer ceramic electronic component, and more particularly, to a large-capacity multilayer ceramic electronic component having excellent reliability.

2. Description of the Related Art

In accordance with the recent trend toward miniaturization of electronic products, the demand for multilayer ceramic electronic components having a small size and large capacitance has been also increased.

Therefore, dielectric layers and inner electrode layers have been thinned and increasingly multilayered by various methods. Recently, as the dielectric layers have been thinned, multilayer ceramic electronic components having an increased number of lamination layers have been manufactured.

As the dielectric layers and the inner electrode layers are thinned in order to realize larger capacitances, the thicknesses of the inner electrode layers may neither be uniform nor continuously maintained, and thus, the inner electrode layers may be partially disconnected, thereby causing a break in the connectivity thereof.

Furthermore, as the inner electrode layers are disconnected, the dielectric layers are partially thickened or thinned although the dielectric layers have a uniform average thickness. Insulating properties in portions in which the dielectric layers are thinned may be deteriorated, resulting in a deterioration of reliability.

Meanwhile, fine-grain ceramic powders contained in an inner electrode paste leak into the dielectric layer during a sintering process, thereby causing abnormal grain growth of dielectric grains in contact with the inner electrode layers. This may result in a deterioration of the reliability of the multilayer ceramic electronic component.

SUMMARY OF THE INVENTION

An aspect of the present invention provides a large-capacity multilayer ceramic electronic component having excellent reliability.

According to an aspect of the present invention, there is provided a multilayer ceramic electronic component, including: a ceramic body including a dielectric layer having an average thickness of 0.6 µm or less; and first and second inner electrode layers within the ceramic body, disposed to face each other with the dielectric layer interposed therebetween, wherein the dielectric layer includes contact dielectric grains in contact with the first or second inner electrode layer and non-contact dielectric grains not in contact with the first or second inner electrode layer, and when an average thickness of the dielectric layer is defined as td and an average diameter of the contact dielectric grains is defined as De, $De/td \leqq 0.35$ is satisfied.

When an average diameter of the non-contact dielectric grains is defined as Dc, $Dc/td \leqq 0.25$ may be satisfied When an average diameter of ceramic powder particles added to the first and second inner electrode layers is defined as Di and an average diameter of ceramic powder particles used in the dielectric layer is defined as Dd, $0.1 < Di/Dd < 1$ may be satisfied.

Ceramic powder added to the first and second inner electrode layers and ceramic powder used in the dielectric layer may have the same composition.

The first or second inner electrode layer may have a continuity of 80% or more.

According to another aspect of the present invention, there is provided a multilayer ceramic electronic component, including: a ceramic body including a dielectric layer having an average thickness of 0.6 µm or less; and first and second inner electrode layers formed within the ceramic body, each having a continuity of 80% or more, wherein the dielectric layer includes contact dielectric grains in contact with the first or second inner electrode layer and non-contact dielectric grains not in contact with the first or second inner electrode layer, and, when an average thickness of the dielectric layer is defined as td and an average diameter of the contact dielectric grains is defined as De, $De/td \leqq 0.35$ is satisfied.

According to another aspect of the present invention, there is provided a multilayer ceramic electronic component, including: a ceramic body including a plurality of dielectric layers laminated therein and having an average thickness of 0.6 µm or less; and a plurality of first and second inner electrode layers formed within the ceramic body, wherein the dielectric layer includes contact dielectric grains in contact with the first or second inner electrode layer and non-contact dielectric grains not in contact with the first or second inner electrode layer, and when an average thickness of the dielectric layer is defined as td and an average diameter of the contact dielectric grains is defined as De, $De/td \leqq 0.35$ is satisfied.

According to another aspect of the present invention, there is provided a multilayer ceramic electronic component, including: a ceramic body including a plurality of dielectric layers laminated therein and having an average thickness of 0.6 µm or less; and a plurality of first and second inner electrode layers formed within the ceramic body, each having a continuity of 80% or more, wherein the dielectric layer includes contact dielectric grains in contact with the first or second inner electrode layer and non-contact dielectric grains not in contact with the first or second inner electrode layer, and, when an average thickness of the dielectric layer is defined as td and an average diameter of the contact dielectric grains is defined as De, $De/td \leqq 0.35$ is satisfied.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENT

Embodiments of the present invention will now be described in detail with reference to the accompanying drawings. The invention may, however, be embodied in many different forms and should not be construed as being limited to the embodiments set forth herein. Rather, these embodiments are provided so that this disclosure will be thorough and complete, and will fully convey the scope of the invention to those skilled in the art. In the drawings, the shapes and dimensions of components may be exaggerated for clarity, and the same reference numerals will be used throughout to designate the same or like components.

Figure 1:
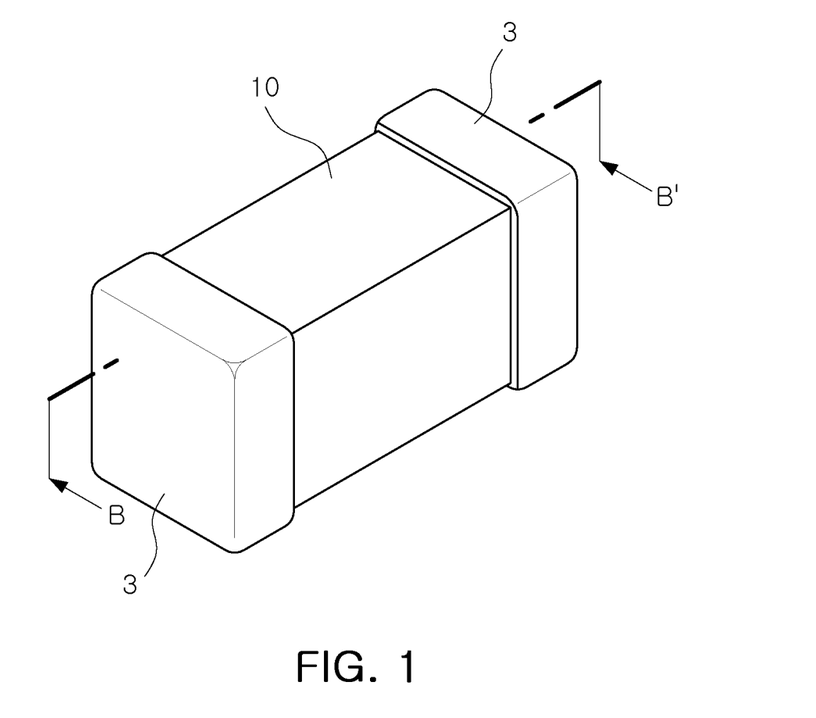
FIG. 1 is a perspective view schematically showing a multilayer ceramic capacitor according to an embodiment of the present invention.

FIG. 1 is a perspective view schematically showing a multilayer ceramic capacitor according to an embodiment of the present invention.

Figure 2:
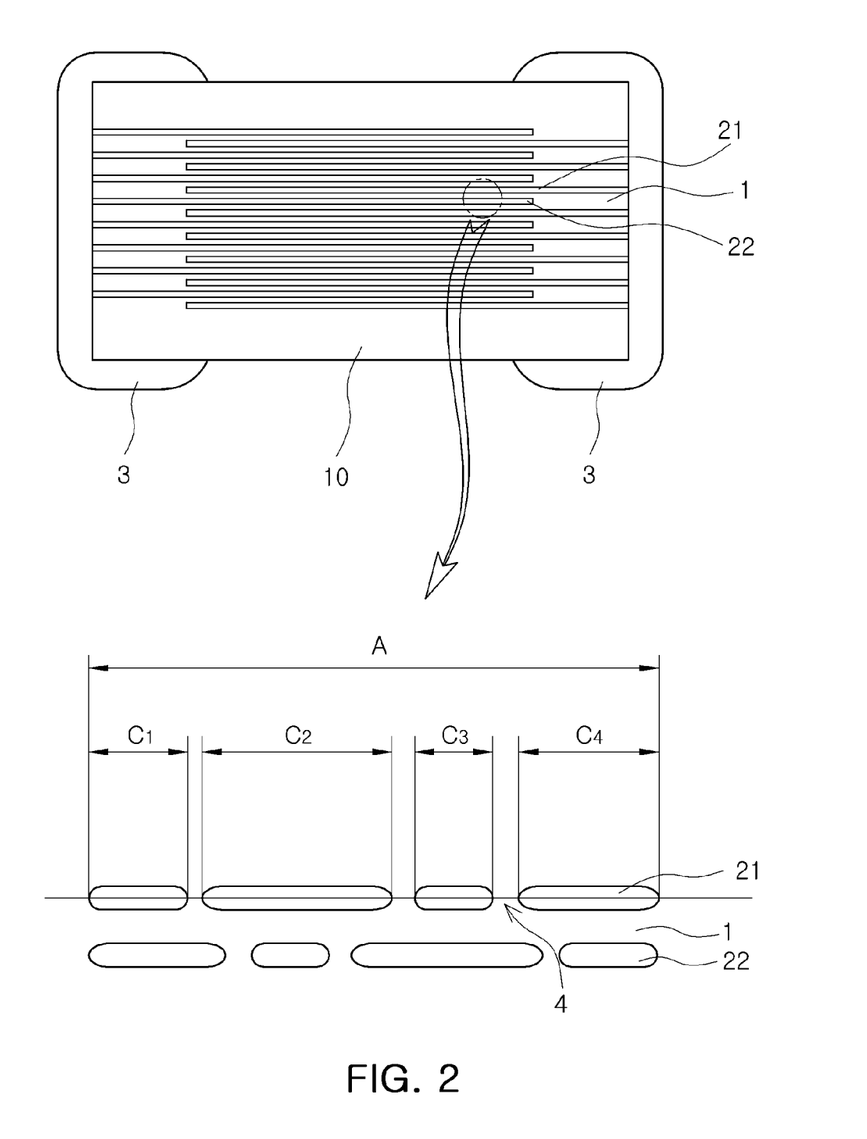
FIG. 2 shows a cross-sectional view taken along line B-B' of FIG. 1 and an enlarged view showing continuity of an inner electrode layer.

FIG. 2 is a cross-sectional view taken along line B-B' of FIG. 1 and an enlarged view showing continuity of an inner electrode layer.

Figure 3:
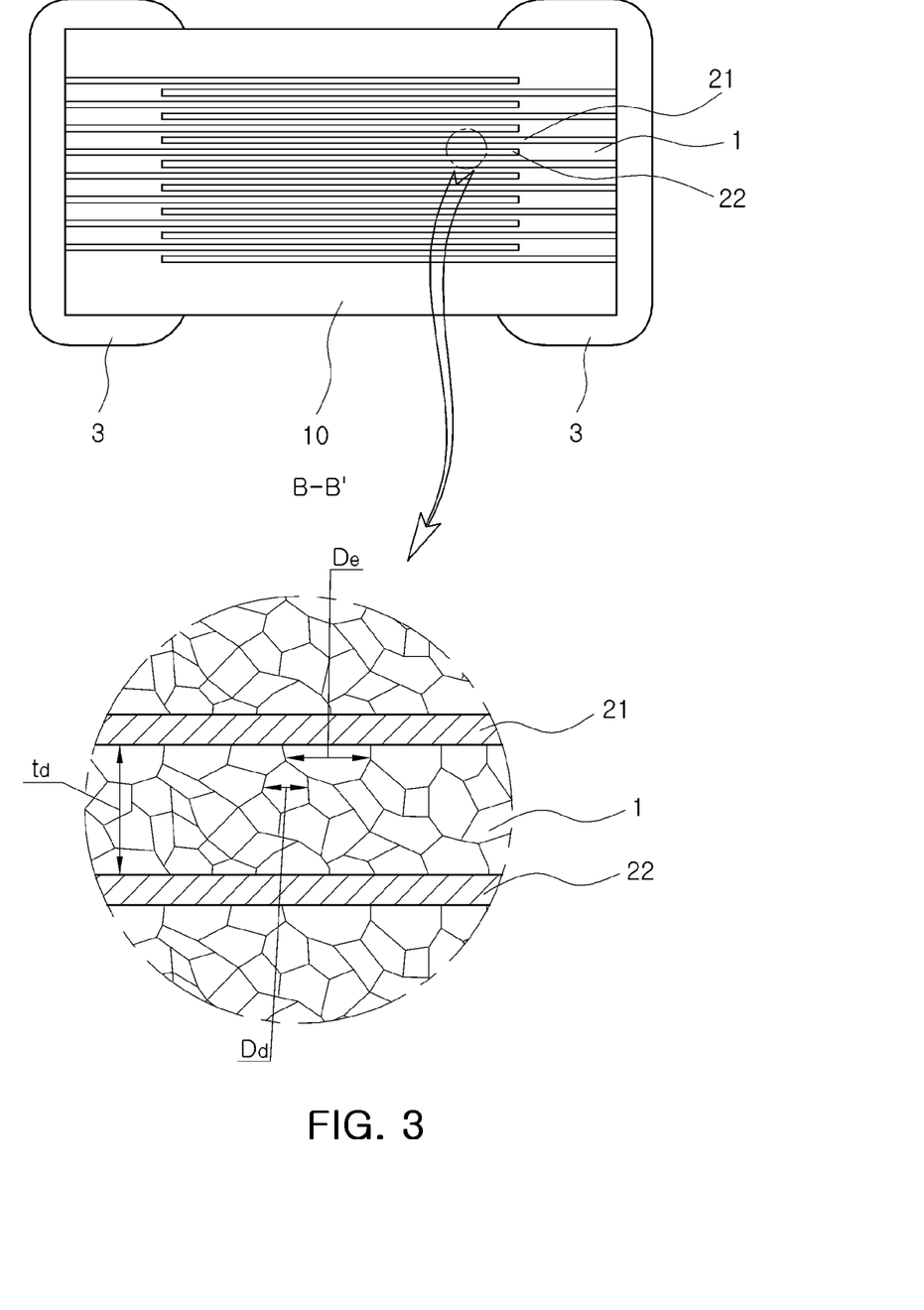
FIG. 3 shows a cross-sectional view taken along line B-B' of FIG. 1 and an enlarged view showing contact dielectric grains and noncontact dielectric grains.

FIG. 3 is a cross-sectional view of FIG. 1 taken along line B-B' and an enlarged view showing contact dielectric grains and noncontact dielectric grains.

Referring to FIGS. 1 through 3, a multilayer ceramic electronic component according to an embodiment of the present invention may include: a ceramic body 10 including a dielectric layer 1 having an average thickness of 0.6 μm or less; and first and second inner electrode layers 21 and 22 disposed to face each other with the dielectric layer 1 interposed therebetween within the ceramic body 10. The dielectric layer 1 may include contact dielectric grains in contact with the first or second inner electrode layer 21 or 22 and non-contact dielectric grains not in contact with the first or second inner electrode layer 21 or 22. When an average thickness of the dielectric layer 1 is defined as td and an average diameter of the contact dielectric grains is defined as De, De/td≦0.35 may be satisfied.

Meanwhile, a multilayer ceramic electronic component according to another embodiment of the present invention may include: a ceramic body 10 including a dielectric layer 1 having an average thickness of 0.6 μm or less; and first and second inner electrode layers 21 and 22 formed within the ceramic body 10, each having a continuity of 80% or more. The dielectric layer 1 may include contact dielectric grains in contact with the first or second inner electrode layer 21 or 22 and non-contact dielectric grains not in contact with the first or second inner electrode layer 21 or 22. When an average thickness of the dielectric layer 1 is defined as td and an average diameter of the contact dielectric grains is defined as De, De/td≦0.35 may be satisfied.

The first and second inner electrode layers 21 and 22 may be formed by using a conductive paste made of at least one of, for example, precious metal materials, such as palladium (Pd), palladium-silver (Pd—Ag) alloy and the like, nickel (Ni), and copper (Cu), but not particularly limited thereto.

Outer electrodes 3 may be formed outside the ceramic body 10 in order to form capacitance, and may be electrically connected with the first and second inner electrode layers 21 and 22.

The outer electrodes 3 may be formed of the same conductive material as that of the inner electrode layers, but not limited thereto. For example, copper (Cu), silver (Ag), nickel (Ni), or the like may be used for the outer electrodes 3.

The outer electrode 3 may be formed by coating a conductive paste prepared by adding glass frit in a metal powder, and then performing a sintering process.

According to the embodiment of the present invention, the average thickness of the dielectric layer 1 may be 0.6 μm or less.

In the embodiment of the present invention, the thickness of the dielectric layer 1 may refer to an average thickness of the dielectric layer 1 disposed between the inner electrode layers 21 and 22.

The average thickness of the dielectric layer 1 may be measured by scanning a cross section in a length direction of the ceramic body 10, using a scanning electron microscope (SEM), as shown in FIG. 2.

For example, as shown in FIG. 2, the average thickness of the dielectric layer 1 may be obtained by measuring thickness at 30 equidistant points in a length direction, in any one dielectric layer extracted from an image obtained by scanning a cross section in a length-thickness (L-T) direction, which is cut in a central part in a width (W) direction of the ceramic body 10, using a scanning electron microscope (SEM), and then calculating an average thickness value.

The thickness at 30 equidistant points may be measured in a capacitance forming part, referring to an area in which the first and second inner electrode layers 21 and 22 overlap each other.

In addition, when this measurement process is extensively performed on ten or more dielectric layers and average values thereof are measured, the average thickness of the dielectric layer may be more generalized.

The thickness of the inner electrode layer 21 or 22 after sintering is not particularly limited so long as it can form capacitance. For example, the thickness of the inner electrode layer may be 1 μm or less.

Referring to FIG. 2, the multilayer ceramic electronic component according to the embodiment of the present invention may include a ceramic body 10 including a dielectric layer 1 having an average thickness of 0.6 μm or less; and first and second inner electrode layers 21 and 22 formed within the ceramic body 10, each having a continuity of 80% or more.

The continuity of the inner electrode layer may be defined as a ratio of an actual total length of electrode portions, to an ideal total length of the first or second inner electrode layer 21 or 22.

For example, the continuity of the inner electrode layer may be measured from an image obtained by scanning a cross section in a length direction of the ceramic body 10 using a scanning electron microscope (SEM), as shown in FIG. 2.

Specifically, as shown in FIG. 2, the continuity of the inner electrode layer may be obtained by measuring the actual total length of the electrode portions of the inner electrode layer based on the ideal total length of the inner electrode layer, in anyone inner electrode layer extracted from an image obtained by scanning a cross section in a length-thickness (L-T) direction, which is cut in a central part in a width (W) direction of the ceramic body 10, using a scanning electron microscope (SEM).

The continuity of the inner electrode layer may be measured in a capacitance forming part, referring to an area in which the first and second inner electrode layers 21 and 22 overlap each other.

In addition, when this measurement process for obtaining the continuity of the inner electrode layer is extensively performed on ten or more inner electrode layers in a central part of the cross section in the length-thickness (L-T) direction and average values thereof are calculated, the continuity of the inner electrode layer may be more generalized.

Specifically, as shown in FIG. 2, when the ideal total length of the first or second inner electrode layer 21 or 22 in any one part thereof is defined as A and actual total lengths of the electrode portions are defined as $c1, c2, c3, \ldots,$ and $cn$, the continuity of the inner electrode layer may be expressed by $(c1+c2+c3+\ldots+cn)/A$.

In FIG. 2, although the electrode portions are expressed by $c1, c2, c3$ and $c4$, the number of the electrode portions is not particularly limited.

In addition, the continuity of the inner electrode layer may refer to a coverage ratio of the inner electrode layer, and may be defined as a ratio of an actual total area of the electrode portions to the ideal total area of the inner electrode layer.

The continuity $(c1+c2+c3+c4/A)$ of the inner electrode layer 21 or 22 may be variously embodied according to a method to be described below. In the multilayer ceramic electronic component according to the embodiment of the present invention, the continuity $(c1+c2+c3+c4/A)$ of the inner electrode layer 21 or 22 may be 80% or more.

In addition, disconnection portions 4 of the inner electrode layer 21 or 22 may be pores or ceramics.

In order to realize the continuity $(c1+c2+c3+c4/A)$ of the inner electrode layer 21 or 22 to be 80% or more, the size of metal powder particles in the conductive paste for forming the inner electrode layer may be varied or the amount of an organic material or ceramic material may be controlled.

In addition, a temperature rise rate and a sintering atmosphere may be adjusted during a sintering process to thereby control the continuity of the inner electrode layer.

According to the embodiment of the present invention, in order to realize the continuity of the inner electrode layer, a method of controlling the size and amount of ceramic particles added to the conductive paste may be used.

Specifically, the ceramic material added in the conductive paste is identical to the ceramic material used in the dielectric layer, but not particularly limited thereto. For example, the ceramic material may be a barium titanate ($BaTiO_3$) powder.

Here, the average diameter Di of the ceramic particles may be commonly known in the art, but is not particularly limited. However, it may be determined in order to control an average diameter of contact dielectric grains in contact with the inner electrode layer 21 or 22.

According to the embodiment of the present invention, the continuity $(c1+c2+c3+c4/A)$ of the inner electrode layer 21 or 22 is realized as 80% or more, whereby a multilayer ceramic capacitor having increased capacitance and excellent reliability may be manufactured.

Referring to FIG. 3, in the multilayer ceramic electronic component according to the embodiment of the present invention, the average thickness td of the dielectric layer 1 after sintering may be 0.6 μm or less.

In addition, the dielectric layer 1 may include contact dielectric grains in contact with the first or second inner electrode layer 21 or 22 and non-contact dielectric grains not in contact with the first or second inner electrode layer 21 or 22. When an average diameter of the contact dielectric grains is defined as De, $De/td \leq 0.35$ may be satisfied.

In this embodiment, the average diameter De of the contact dielectric grains may be measured by analyzing an image of a cross section of the dielectric layer extracted by a scanning electron microscope (SEM). For example, an average grain size of the dielectric layer may be measured by using a grain size measurement software supporting an average grain size measurement method defined by American Society for Testing and Materials (ASTM) E112.

The average diameter De of the contact dielectric grains may be adjusted by controlling an average diameter of ceramic powder particles used in the forming of the dielectric layer 1 and an average diameter of ceramic powder particles added to the conductive paste for forming the first and second inner electrode layers 21 and 22.

The average diameter of the ceramic powder particles used in the forming of the dielectric layer 1 is not particularly limited, and may be controlled so as to attain the objects of the present invention. For example, the average diameter of the ceramic powder particles may be 300 nm or less.

In a case in which a ratio (De/td) of the average diameter De of the contact dielectric grains to the average thickness td of 0.6 μm or less of the dielectric layer 1 is 0.35 or less, a high-capacity multilayer ceramic capacitor having excellent reliability may be realized.

In a case in which a ratio (De/td) of the average diameter De of the contact dielectric grains to the average thickness td of the dielectric layer 1 is above 0.35, the reliability of the multilayer ceramic electronic component in which such a thin-film dielectric layer is employed may be deteriorated since the average diameter of the contact dielectric grains is large.

In addition, when an average diameter of the non-contact dielectric grains is defined as Dc, $Dc/td \leq 0.25$ may be satisfied.

The average diameter Dc of the non-contact dielectric grains may be measured by analyzing an image of a cross section of the dielectric layers, as shown in FIG. 3, which is cut in a laminating direction of the dielectric layers and scanned by a scanning electron microscope (SEM). For example, an average grain size of the dielectric layer may be measured by using a grain size measurement software supporting an average grain size measurement method defined by American Society for Testing and Materials (ASTM) E112.

Specifically, in a case in which a ratio (Dc/td) of the average diameter Dc of the non-contact dielectric grains to the average thickness td of 0.6 μm or less of the dielectric layer 1 is 0.25 or less, a high-capacity multilayer ceramic capacitor having excellent reliability may be realized.

The average diameter Dc of the non-contact dielectric grains may be also adjusted by controlling the average diameter of ceramic powder particles used in the forming of the dielectric layer 1, so as to attain the objects of the present invention.

Also, in a case in which a ratio (Dc/td) of the average diameter Dc of the non-contact dielectric grains to the average thickness td of the dielectric layer 1 is above 0.25, the reliability of the multilayer ceramic electronic component according to the embodiment of the present invention may be deteriorated since the average diameter of the non-contact dielectric grains is large.

According to the embodiment of the present invention, a raw material for forming the dielectric layer 1 is not particularly limited as long as sufficient capacitance can be obtained. For example, the raw material may be a barium titanate ($BaTiO_3$) powder.

As a material for forming the dielectric layer 1, various ceramic additives, organic solvents, plasticizers, binders, dispersants, or the like may be added to a powder such as the barium titanate ($BaTiO_3$) powder.

According to the embodiment of the present invention, a high-capacity multilayer ceramic capacitor having excellent reliability can be realized when the average thickness td of the dielectric layer 1 is 0.6 μm or less, the continuity $(c1+c2+c3+c4\,cn/A)$ of the first or second inner electrode layer 21 or 22 is 80% or more, the ratio (De/td) of the average diameter of the contact dielectric grains to the average thickness of the dielectric layer 1 is 0.35 or less, and the ratio (Dc/td) of the average diameter of the non-contact dielectric grains to the average thickness of the dielectric layer 1 is 0.25 or less.

Meanwhile, when an average diameter of ceramic powder particles added to the inner electrode layer is defined as Di and an average diameter of ceramic powder particles used in the dielectric layer is defined as Dd, 0.1<Di/Dd<1 may be satisfied.

In a case in which Di/Dd is 0.1 or less, a difference between the average diameter of ceramic powder particles added to the inner electrode layer and the average diameter of ceramic powder particles used in the dielectric layer is so large that sintering shrinkage of the inner electrode layer is not effectively suppressed, thereby causing problems in the forming of capacitance due to a deterioration of electrode continuity. In addition, since the inner electrode layer is thickened at ends of each disconnection portion, a distance between adjacent inner electrode layers is shortened, resulting in a lowering of breakdown voltage, whereby reliability is deteriorated.

Furthermore, in a case in which Di/Dd is above 1, since the average diameter of ceramic powder particles added to the inner electrode layer is larger than the average diameter of ceramic powder particles used in the dielectric layer, sintering shrinkage of the inner electrode layer is not effectively suppressed, and the ceramic powder particles added to the inner electrode layer leak into the dielectric layer during a sintering procedure such that the thickness of the dielectric layer may be excessively increased, thereby causing problems in the forming of capacitance and reliability.

A high-capacity multilayer ceramic electronic component having excellent reliability can be realized when the average diameter Di of ceramic powder particles added to the inner electrode layer and the average diameter Dd of ceramic powder particles used in the dielectric layer satisfy 0.1<Di/Dd<1.

In addition, a composition of the ceramic powder used in the dielectric layer and that of the ceramic powder added to the inner electrode layer are not particularly limited; however, when they are identical to each other, reliability may be improved.

Meanwhile, a multilayer ceramic electronic component according to another embodiment of the present invention may include: a ceramic body 10 including a plurality of dielectric layers 1 laminated therein and having an average thickness of 0.6 μm or less; and a plurality of first and second inner electrode layers 21 and 22 formed within the ceramic body 10. The dielectric layers 1 may include contact dielectric grains in contact with the first or second inner electrode layer 21 or 22 and non-contact dielectric grains not in contact with the first or second inner electrode layer 21 or 22. When the average thickness of the dielectric layers 1 is defined as td and an average diameter of the contact dielectric grains is defined as De, De/td≦0.35 may be satisfied.

Meanwhile, a multilayer ceramic electronic component according to another embodiment of the present invention may include: a ceramic body 10 including a plurality of dielectric layers 1 laminated therein and having an average thickness of 0.6 μm or less; and a plurality of first and second inner electrode layers 21 and 22 formed within the ceramic body 10, each having a continuity of 80% or more. The dielectric layers 1 may include contact dielectric grains in contact with the first or second inner electrode layer 21 or 22 and non-contact dielectric grains not in contact with the first or second inner electrode layer 21 or 22. When the average thickness of the dielectric layers 1 is defined as td and an average diameter of the contact dielectric grains is defined as De, De/td≦0.35 may be satisfied.

Since the multilayer ceramic electronic component according to this embodiment is substantially identical to the multilayer ceramic electronic component according to the previous embodiment except that the dielectric layers and the first and second inner electrode layers are laminated in plural, descriptions overlapping each other will be omitted.

Hereafter, the present invention will be described in detail with reference to examples, but is not limited thereto.

Tests were performed in order to determine the degree of continuity of the first or second inner electrode layer 21 or 22 according to the amount of barium titanate inputted therein, and improvement in reliability according to various average diameters of contact dielectric grains and non-contact dielectric grains, in multilayer ceramic capacitors in which dielectric layers 1 having an average thickness of 0.6 μm or less are provided.

Each multilayer ceramic capacitor was manufactured as follows.

First, a slurry including a powder, such as barium titanate ($BaTiO_3$) or the like, was coated on a carrier film and dried to prepare a plurality of ceramic green sheets having a thickness of 1.05 μm or 0.95 μm, thereby forming dielectric layers 1.

Then, a conductive paste for inner electrode layers was prepared. Here, an average diameter of barium titanate powder particles added to the inner electrode layers was controlled such that an average size of nickel particles was 0.05 μm to 0.2 μm, and 0.1<Di/Dd<1 was satisfied. The amount of barium titanate powder was varied by 5 to 10% based on the weight of nickel.

The conductive paste for inner electrode layers was coated on the green sheets by a screen printing method to thereby form inner electrode layers, and then the resulting structures were then laminated in amounts of 200 to 250 layers to manufacture a laminate.

Laminate compressing and cutting processes were subsequently performed to manufacture a chip having a 0603 standard size, and the chip was sintered at a temperature of 105☐ to 120☐ under a reduction atmosphere of $H_2$ of 0.1% or less.

Then, an outer electrode forming process, a plating process, and the like were performed to manufacture a multilayer ceramic capacitor.

Multilayer ceramic capacitor samples were variously manufactured according to the average thickness of the dielectric layers 1. As a result of observing cross sections of the multilayer ceramic capacitors, the average thickness of the inner electrode layers was 0.4 μm to 0.9 μm and the average thickness of the dielectric layers was 0.5 μm to 0.8 μm.

In addition, the continuity of the inner electrode layers was determined by measuring continuity in a capacitance forming part of 10 inner electrode layers in a central part of a cross section in a length-thickness (L-T) direction, which is cut in a central part in a width (W) direction of the laminate ceramic body 10. In order to determine the degree of the continuity of the inner electrode layer, a ratio of the actual total length of the electrode portions to the ideal total length of the inner electrode layer was measured from an image obtained by scanning a cross section of the 10 inner electrode layers using a scanning electron microscope (SEM).

Table 1 below shows the continuity of the inner electrode layer according to the input ratio of barium titanate ($BaTiO_3$) powders inputted into the inner electrode layer, and high-temperature accelerated lifespan according to the thickness of the dielectric layers and average diameters of contact dielectric grains and non-contact dielectric grains.

TABLE 1

| Sample No. | Average Diameter of Dielectric Powder ($D_d$) (nm) | Average Thickness of Dielectric Green Sheet ($D_i$) (μm) | Ceramic Powder Size in Inner Electrode Layer Paste ($D_i$) (nm) | BaTiO₃ Content in Inner Electrode Layer Paste (%) | Continuity of Inner Electrode Layer (B/A) | Thickness of Dielectric Layer $t_d$ (μm) | Average Diameter of Contact Dielectric Grain $D_e$ (μm) | Average Diameter of Non-contact Dielectric Grain $D_c$ (μm) | $D_e/t_d$ | $D_c/t_d$ | NG rate In High-temperature Accelerated Lifespan |
|---|---|---|---|---|---|---|---|---|---|---|---|
| 1 | 100 | 1.05 | 20 | 15.0 | 0.94 | 0.62 | 0.230 | 0.142 | 0.37 | 0.23 | 0/200 |
| 2 | 120 | 1.05 | 20 | 7.5 | 0.80 | 0.61 | 0.210 | 0.165 | 0.34 | 0.27 | 0/200 |
| *3 | 100 | 1.05 | 10 | 7.5 | 0.65 | 0.60 | 0.225 | 0.138 | 0.38 | 0.23 | 4/200 |
| *4 | 120 | 1.05 | 50 | 7.5 | 0.81 | 0.59 | 0.205 | 0.155 | 0.35 | 0.26 | 1/200 |
| *5 | 100 | 1.05 | 20 | 5.0 | 0.78 | 0.58 | 0.163 | 0.142 | 0.28 | 0.24 | 2/200 |
| *6 | 100 | 0.95 | 20 | 15.0 | 0.95 | 0.57 | 0.228 | 0.139 | 0.40 | 0.24 | 2/200 |
| *7 | 100 | 0.95 | 50 | 5.0 | 0.72 | 0.53 | 0.160 | 0.132 | 0.30 | 0.25 | 3/200 |
| *8 | 100 | 0.95 | 20 | 5.0 | 0.77 | 0.52 | 0.158 | 0.130 | 0.30 | 0.25 | 3/200 |

Referring to Table 1, Samples 1 and 2 each had dielectric layers with an average thickness of above 0.6 μl. In these cases, good results are shown in a high-temperature accelerated lifespan test even in the case that a ratio ($D_e/t_d$) of the average diameter of contact dielectric grains to the average thickness of the dielectric layers 1 and a ratio ($D_c/t_d$) of the average diameter of non-contact dielectric grains to the average thickness of the dielectric layers 1 deviate from a numerical value range of the present invention.

On the other hand, Samples 3 to 8 each had dielectric layers with an average thickness of 0.6 μm or less. In these cases, problems may occur in a high-temperature accelerated lifespan test and a reliability test if the continuity of the inner electrode layer, the ratio ($D_e/t_d$) of the average diameter of contact dielectric grains to the average thickness of the dielectric layers 1, and the ratio ($D_c/t_d$) of the average diameter of non-contact dielectric grains to the average thickness of the dielectric layers 1 deviate from a numerical value range of the present invention.

Therefore, it could be seen that the multilayer ceramic electronic component according to an embodiment of the present invention has improved effects in high-temperature accelerated lifespan and reliability when the average thickness td of the dielectric layers 1 is 0.6 μm or less after sintering.

Table 2 below shows the continuity of the inner electrode layer according to the input ratio of barium titanate (BaTiO₃) powders inputted in the inner electrode layer, and high-temperature accelerated lifespan according to the average diameters of contact dielectric grains and non-contact dielectric grains, in a case in which the average thickness td of the dielectric layers is 0.6 μm or less.

TABLE 2

| Sample No. | Average Diameter of Dielectric Powder ($D_d$) (nm) | Average Thickness of Dielectric Green Sheet ($D_i$) (μm) | Ceramic Powder Size in Inner Electrode Layer Paste ($D_i$) (nm) | BaTiO₃ Content in Inner Electrode Layer Paste (%) | Continuity of Inner Electrode Layer (B/A) | Thickness of Dielectric Layer $t_d$ (μm) | Average Diameter of Contact Dielectric Grain $D_e$ (μm) | Average Diameter of Non-contact Dielectric Grain $D_c$ (μm) | $D_e/t_d$ | $D_c/t_d$ | NG rate In High-temperature Accelerated Lifespan |
|---|---|---|---|---|---|---|---|---|---|---|---|
| *9 | 100 | 1.05 | 10 | 10.0 | 0.70 | 0.59 | 0.235 | 0.142 | 0.40 | 0.24 | 3/200 |
| *10 | 100 | 1.05 | 10 | 7.5 | 0.65 | 0.60 | 0.225 | 0.138 | 0.38 | 0.23 | 4/200 |
| *11 | 100 | 1.05 | 20 | 15.0 | 0.94 | 0.62 | 0.230 | 0.142 | 0.37 | 0.23 | 1/200 |
| 12 | 100 | 1.05 | 20 | 10.0 | 0.92 | 0.60 | 0.195 | 0.138 | 0.33 | 0.23 | 0/200 |
| 13 | 100 | 1.05 | 20 | 7.5 | 0.82 | 0.60 | 0.175 | 0.140 | 0.29 | 0.23 | 0/200 |
| *14 | 100 | 1.05 | 20 | 5.0 | 0.78 | 0.58 | 0.163 | 0.142 | 0.28 | 0.24 | 2/200 |
| *15 | 120 | 1.05 | 20 | 7.5 | 0.80 | 0.61 | 0.210 | 0.165 | 0.34 | 0.27 | 1/200 |
| 16 | 100 | 1.05 | 50 | 10.0 | 0.87 | 0.58 | 0.200 | 0.142 | 0.34 | 0.24 | 0/200 |
| 17 | 100 | 1.05 | 50 | 7.5 | 0.81 | 0.58 | 0.183 | 0.140 | 0.32 | 0.24 | 0/200 |
| *18 | 100 | 1.05 | 50 | 5.0 | 0.74 | 0.56 | 0.178 | 0.139 | 0.32 | 0.25 | 1/200 |
| *19 | 120 | 1.05 | 50 | 7.5 | 0.81 | 0.59 | 0.205 | 0.155 | 0.35 | 0.26 | 1/200 |
| *20 | 100 | 0.95 | 20 | 15.0 | 0.95 | 0.57 | 0.228 | 0.139 | 0.40 | 0.24 | 2/200 |
| 21 | 100 | 0.95 | 20 | 10.0 | 0.92 | 0.55 | 0.193 | 0.138 | 0.35 | 0.25 | 0/200 |
| 22 | 100 | 0.95 | 20 | 7.5 | 0.84 | 0.54 | 0.180 | 0.136 | 0.33 | 0.25 | 0/200 |
| *23 | 100 | 0.95 | 20 | 5.0 | 0.77 | 0.52 | 0.158 | 0.130 | 0.30 | 0.25 | 3/200 |
| *24 | 120 | 0.95 | 20 | 7.5 | 0.81 | 0.53 | 0.205 | 0.160 | 0.39 | 0.30 | 2/200 |
| *25 | 100 | 0.95 | 50 | 15.0 | 0.93 | 0.58 | 0.208 | 0.138 | 0.36 | 0.24 | 2/200 |
| 26 | 100 | 0.95 | 50 | 10.0 | 0.84 | 0.56 | 0.191 | 0.140 | 0.34 | 0.25 | 0/200 |
| 27 | 100 | 0.95 | 50 | 7.5 | 0.80 | 0.56 | 0.170 | 0.141 | 0.30 | 0.25 | 0/200 |
| *28 | 100 | 0.95 | 50 | 5.0 | 0.72 | 0.53 | 0.160 | 0.132 | 0.30 | 0.25 | 3/200 |
| *29 | 120 | 0.95 | 50 | 7.5 | 0.81 | 0.58 | 0.200 | 0.163 | 0.34 | 0.28 | 4/200 |

As seen in Table 2, as the continuity (B/A) of the inner electrode layer is increased to 0.8 or more, the accelerated lifespan is increased and reliability is improved.

In addition, it could be seen that the accelerated lifespan is increased and reliability is improved when the continuity of the inner electrode layer is 0.8 or more and the ratio (De/td) of the average diameter of the contact dielectric grains to the average thickness of the dielectric layers 1 is 0.35 or less.

Furthermore, it could be seen that the accelerated lifespan is increased and reliability is improved when the continuity (B/A) of the inner electrode layer is 0.8 or more, the ratio (De/td) of the average diameter of the contact dielectric grains to the average thickness of the dielectric layers 1 is 0.35 or less, and the ratio (Dc/td) of the average diameter of the non-contact dielectric grains to the average thickness of the dielectric layers 1 is 0.25 or less.

As set forth above, according to embodiments of the present invention, a large-capacity multilayer ceramic electronic component is manufactured to have improved continuity of the inner electrode layer, large capacitance, extended accelerated lifespan and excellent reliability due to an average diameter of dielectric grains being controlled.

While the present invention has been shown and described in connection with the embodiments, it will be apparent to those skilled in the art that modifications and variations can be made without departing from the spirit and scope of the invention as defined by the appended claims.

What is claimed is:

1. A multilayer ceramic electronic component, comprising:
    a ceramic body including a dielectric layer having an average thickness of 0.6 μm or less; and
    first and second inner electrode layers within the ceramic body, disposed to face each other with the dielectric layer interposed therebetween, wherein:
    the dielectric layer includes contact dielectric grains in contact with the first or second inner electrode layer and non-contact dielectric grains not in contact with the first or second inner electrode layer,
    when an average thickness of the dielectric layer is defined as td and an average diameter of the contact dielectric grains is defined as De, De/td≦0.35 is satisfied, and
    when an average diameter of ceramic powder particles added to the first and second inner electrode layers is defined as Di and an average diameter of ceramic powder particles used in the dielectric layer is defined as Dd, 0.1<Di/Dd<1 is satisfied.

2. The multilayer ceramic electronic component of claim 1, wherein, when an average diameter of the non-contact dielectric grains is defined as Dc, Dc/td≦0.25 is satisfied.

3. The multilayer ceramic electronic component of claim 1, wherein ceramic powder added to the first and second inner electrode layers and ceramic powder used in the dielectric layer have the same composition.

4. The multilayer ceramic electronic component of claim 1, wherein the first or second inner electrode layer has a continuity of 80% or more.

5. A multilayer ceramic electronic component, comprising:
    a ceramic body including a dielectric layer having an average thickness of 0.6 μm or less; and
    first and second inner electrode layers formed within the ceramic body, each having a continuity of 80% or more, wherein:
    the dielectric layer includes contact dielectric grains in contact with the first or second inner electrode layer and non-contact dielectric grains not in contact with the first or second inner electrode layer,
    when an average thickness of the dielectric layer is defined as td and an average diameter of the contact dielectric grains is defined as De, De/td≦0.35 is satisfied, and
    when an average diameter of ceramic powder particles added to the first and second inner electrode layers is defined as Di and an average diameter of ceramic powder particles used in the dielectric layer is defined as Dd, 0.1<Di/Dd<1 is satisfied.

6. The multilayer ceramic electronic component of claim 5, wherein, when an average diameter of the non-contact dielectric grains is defined as Dc, Dc/td≦0.25 is satisfied.

7. The multilayer ceramic electronic component of claim 5, wherein ceramic powder added to the first and second inner electrode layers and ceramic powder used in the dielectric layer have the same composition.

8. A multilayer ceramic electronic component, comprising:
    a ceramic body including a plurality of dielectric layers laminated therein and having an average thickness of 0.6 μm or less; and
    a plurality of first and second inner electrode layers formed within the ceramic body, wherein:
    the dielectric layer includes contact dielectric grains in contact with the first or second inner electrode layer and non-contact dielectric grains not in contact with the first or second inner electrode layer,
    when an average thickness of the dielectric layer is defined as td and an average diameter of the contact dielectric grains is defined as De, De/td≦0.35 is satisfied, and
    when an average diameter of ceramic powder particles added to the first and second inner electrode layers is defined as Di and an average diameter of ceramic powder particles used in the dielectric layer is defined as Dd, 0.1<Di/Dd<1 is satisfied.

9. The multilayer ceramic electronic component of claim 8, wherein, when an average diameter of the non-contact dielectric grains is defined as Dc, Dc/td≦0.25 is satisfied.

10. The multilayer ceramic electronic component of claim 8, wherein ceramic powder added to the first and second inner electrode layers and ceramic powder used in the dielectric layer have the same composition.

11. The multilayer ceramic electronic component of claim 8, wherein the first or second inner electrode layer has a continuity of 80% or more.

12. A multilayer ceramic electronic component, comprising:
    a ceramic body including a plurality of dielectric layers laminated therein and having an average thickness of 0.6 μm or less; and
    a plurality of first and second inner electrode layers formed within the ceramic body, each having a continuity of 80% or more, wherein:
    the dielectric layer includes contact dielectric grains in contact with the first or second inner electrode layer and non-contact dielectric grains not in contact with the first or second inner electrode layer,
    when an average thickness of the dielectric layer is defined as td and an average diameter of the contact dielectric grains is defined as De, De/td≦0.35 is satisfied, and
    when an average diameter of ceramic powder particles added to the first and second inner electrode layers is defined as Di and an average diameter of ceramic powder particles used in the dielectric layer is defined as Dd, 0.1<Di/Dd<1 is satisfied.

13. The multilayer ceramic electronic component of claim 12, wherein, when an average diameter of the non-contact dielectric grains is defined as Dc, $Dc/td \leqq 0.25$ is satisfied.

14. The multilayer ceramic electronic component of claim 12, wherein ceramic powder added to the first and second inner electrode layers and ceramic powder used in the dielectric layer have the same composition.

* * * * *